United States Patent [19]
Harada et al.

[11] Patent Number: 4,626,701
[45] Date of Patent: Dec. 2, 1986

[54] RECTIFYING CIRCUIT COMPRISING A SUPERCONDUCTIVE DEVICE

[75] Inventors: Yutaka Harada, Kodaira; Kunio Yamashita, Hachiouji; Nobuo Kotera, Kokubunji; Ushio Kawabe, Hamura, all of Japan

[73] Assignee: Hitachi, Ltd., Tokyo, Japan

[21] Appl. No.: 697,469

[22] Filed: Feb. 1, 1985

Related U.S. Application Data

[60] Division of Ser. No. 515,030, Jul. 18, 1983, abandoned, which is a continuation of Ser. No. 221,403, Dec. 30, 1980, abandoned.

[30] Foreign Application Priority Data

Jan. 28, 1980 [JP] Japan .................................. 55-7821

[51] Int. Cl.$^4$ ...................... H03K 17/92; H02M 7/02
[52] U.S. Cl. .................................. 307/245; 307/476; 307/306; 363/14
[58] Field of Search ............... 307/245, 462, 476, 306; 363/14

[56] References Cited

U.S. PATENT DOCUMENTS 3,356,924 12/1967 Buchhold .............................. 363/14
4,092,553 5/1978 Fang et al. .......................... 307/476

Primary Examiner—John Zazworsky
Attorney, Agent, or Firm—Antonelli, Terry & Wands

[57] ABSTRACT

A rectifying circuit includes a superconductive device and a circuit which controls a magnetic field to be applied to the superconductive device in response to the phase of an A.C. signal applied to the superconductive device, the state of the superconductive device being alternately and repeatedly changed-over between a superconductive state and a nonsuperconductive state by the magnetic field so as to rectify the A.C. signal.

7 Claims, 12 Drawing Figures

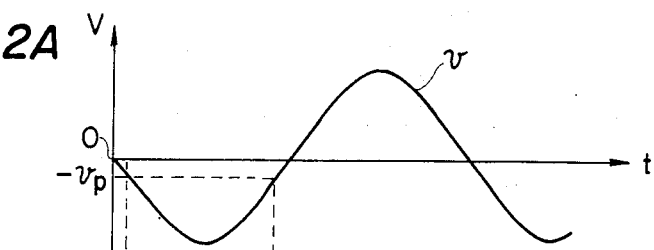
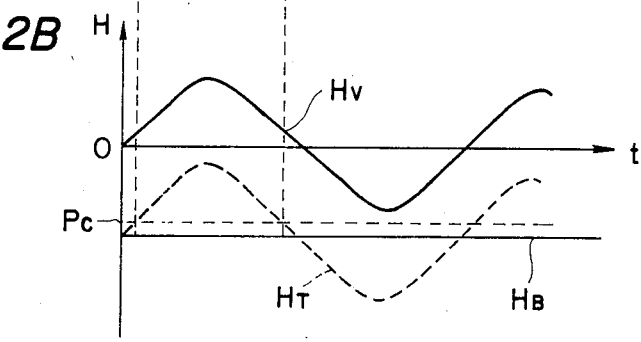
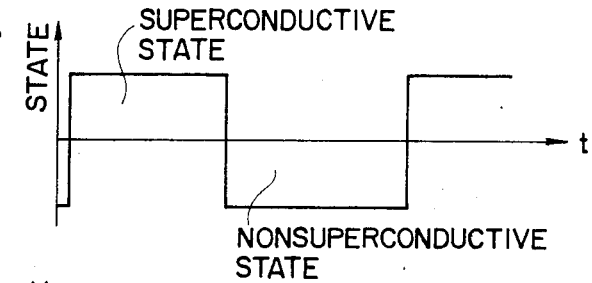
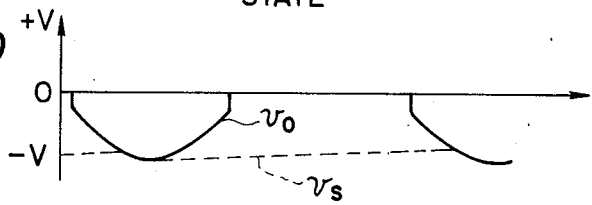

RECTIFYING CIRCUIT COMPRISING A SUPERCONDUCTIVE DEVICE

This is a division of application Ser. No. 515,030 filed July 18, 1983 which was a continuation application of Ser. No. 221,403, filed Dec. 30, 1980, both abandoned.

BACKGROUND OF THE INVENTION

In recent years, research in logic circuits employing Josephson tunneling-junction devices (hereinbelow termed "Josephson devices") has been vigorously conducted. In order to drive the logic circuit, a rectifying circuit for obtaining a stable D.C. voltage of low magnitude on the order of several mV from a commerical A.C. power source has been desired.

In one type of rectifying circuit, a direct current is obtained by passing an alternating current from a commerical A.C. power source through a transformer to bring it to a predetermined voltage, which voltage is then subjected to full-wave or half-wave rectification by means of a rectifying device, such as a diode, and is filtered using a coil, a capacitor or the like. The prior art circuit, however, has the disadvantage that it is difficult to obtain a stable D.C. voltage of low magnitude on the order of several mV because of the thermal noise produced by the rectifying device, such as a diode, constituting this circuit.

By way of example, the thermal noise at room temperature of 300° K. is as great as approximately several tens of millivolts, and therefore, a D.C. voltage on the order of several mV cannot be stably obtained with use of such a rectifying device at room temperature.

In an effort to eliminate the influence of the thermal noise on the system, it has also been considered to rectify the A.C. voltage by means of a diode which is maintained at the extremely low temperature of 4° K. at which the Josephson device operates. At such an extremely low temperature, however, the diffusion coefficient of a semiconductor becomes substantially zero, and the semiconductor diode does not operate, so that rectification is impossible.

SUMMARY OF THE INVENTION

This invention has for its object to provide a rectifying circuit in which thermal noise is substantially eliminated.

A rectifying circuit according to this invention comprises a superconductive device, and a circuit which controls the magnitude of a magnetic field to be applied to the superconductive device in response to the phase of an A.C. signal applied to the superconductive device, the state of the superconductive device being alternately and repeatedly changed-over between a superconductive state and a nonsuperconductive state by the magnetic field so as to rectify the A.C. signal.

BRIEF DESCRIPTION OF THE DRAWINGS

FIG. 2A is a diagram showing an input A.C. signal;

FIG. 2B is a diagram showing a magnetic field applied to a Josephson device,

FIG. 2C is a diagram showing the conductive state of the Josephson device;

FIG. 2D is a diagram showing an output signal concerning the half-wave rectifying circuit in FIG. 1;

DETAILED DESCRIPTION OF THE PREFERRED EMBODIMENTS

Figure 1:
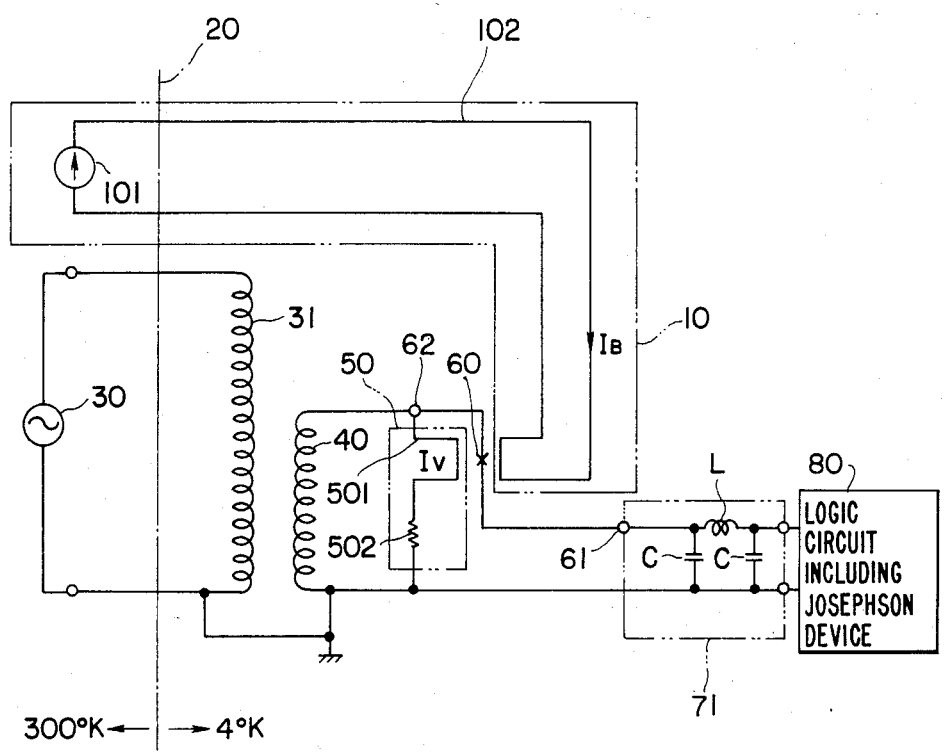
FIG. 1 is a diagram of a half-wave rectifying circuit according to this invention.

FIG. 1 is a diagram showing a half-wave rectifying circuit, which is a first embodiment of this invention. Referring to the figure, a one-dot chain line 20 is a line which represents a temperature boundary and at which a heat insulating material (not shown) is disposed. The elements on the left side of the line are maintained at room temperature of about 300° K., and on the right side of line 20 elements are maintained at the extremely low temperature of about 4° K. Leads and coils which are located on the right side of line 20 are made of superconductive materials, and all of them are held in the superconductive state. An A.C. signal is supplied from an A.C. power source 30 at room temperature to the primary coil 31 of a transformer disposed at the extremely low temperature side of line 20. The secondary coil 40 of the transformer is magnetically coupled with the primary coil, and the number of turns of the secondary coil 40 is made smaller than that of the primary coil 31, so that an A.C. signal v of decreased voltage level (FIG. 2A) is generated across the secondary coil 40. One end of each of the primary and secondary coils is grounded. The A.C. signal v of decreased voltage is rectified by a rectifying circuit consisting of circuits 10 and 50 and a Josephson device 60 to be described in detail later, the rectified signal is smoothed by a $\pi$-type filtering circuit 71 consisting of a pair of capacitances C and an inductance L, and the smoothed signal is applied to load logic circuit 80 including Josephson devices.

There will now be described the arrangement of the rectifying circuit consisting of the circuits 10 and 50 and the Josephson device 60. The Josephson device 60 is a known type of superconductive device. It has the property that it falls into the superconductive state when the magnitude of a magnetic field applied externally does not exceed a predetermined transition value $P_c$, and that it falls into the non-superconductive state (that is the voltage when the magnitude of the magnetic field exceeds the predetermined tranistion value). One terminal 62 of the Josephson device 60 is connected to the non-grounded side of the secondary coil 40, and therefore, it receives the A.C. signal v of decreased voltage. The other terminal 61 is connected to the filtering circuit 71. The bias-magnetic-field supply current 10 consists of a constant-current source 101 held at room temperature, and the lead 102. A part of the lead 102 is proximate to the Josephson device 60, and it applies to the Josephson device 60 a bias magnetic field $H_B$ which is generated by a bias current $I_B$ supplied from the constant-current source 101 to the lead 102. The control-magnetic-field supply circuit 50 consists of the lead 501 and the resistor 502. One end of the lead 501 is connected on the non-grounded side of the secondary coil 40, while the other end is grounded through the resistor 502. A part of the lead 501 is proximate to the Josephson device 60, and current $I_v$ with a direction and a magntide which are respectively dependent upon the polarity and the magnitude of the A.C. voltage v induced across the secondary coil 40 flows through the lead 501. A magnetic field $H_v$ generated by this current, as illustrated in FIG. 2B, is applied to the Josephson device 60, and it controls the conductive state of the device 60 by acting together with the bias magnetic field $H_B$.

FIG. 2B is a waveform diagram of the magnetic field which is applied to the device 60, and the direction of the magnetic field into the plane of the sheet of FIG. 1 from above is illustrated as the positive direction. If the magnitude of the bias magnetic field $H_B$ is set with respect to the predetermined value $P_c$ stated before, the combined magnetic field $H_T$ formed by the magnetic fields $H_v$ and $H_B$ changes with respect to the value $P_c$ as shown in FIG. 2B. The Josephson device 60 accordingly will have its conductive state changed in response to the phase of the A.C. signal v in such a manner that is illustrated in FIGS. 2B and 2C, it is placed in the superconductive state when the combined magnetic field $H_T$ exceeds the predetermined value $P_c$, i.e., when the A.C. signal v is below a value $-v_p$, as seen from FIG. 2A; while, it is placed in the nonsuperconductive state (voltage state) when the combined magnetic field does not exceed the predetermined value, i.e., when the A.C. signal v is above the value $-v_p$.

Accordingly, a voltage at the output terminal 61 of the Josephson device 60 at the time when this terminal 61 is in the open state without being connected to the filtering circuit 71 changes as shown at $v_o$ in FIG. 2D. Consequently, an output voltage at the filtering circuit 71 connected to the output terminal 61 becomes a relatively-flat voltage $v_s$ as shown in FIG. 2D, as a result of smoothing $v_o$ with the filter.

When the magnitude of the bias magnetic field $H_B$ is chosen to coincide with the predetermined value $P_c$, the Josephson device 60 is placed in the superconductive state during the negative half cycles of the A.C. signal v and in the nonsuperconductive state during the positive half cycles thereof, as understood from FIGS. 2A–2C, and hence, the rectifying efficiency can be maximized.

It is also possible to construct the bias magnetic field control in a slightly-different way. In this revised embodiment, the absolute value of the bias magnetic field $H_B$ is set to be greater than the absolute value of the predetermined value $P_c$. In this case, the relation $|H_B| > |P_c|$ is satisfied. Then, a new bias magnetic field $H'_{v'}$, whose magnitude is to satisfy the equation $H'_v > ||H_B| - |P_c||$, is applied so as to put the Josephson device 60 into the superconductive state due to the reduction of the combined magnetic field $H_T$, when the phase of the A.C. signal v lies in a predetermined range, for example, when the sign of the A.C. signal is negative, as shown in FIG. 2A, and the amplitude thereof is in excess of a value $v_p$. At the other times when the phase of the A.C. signal v lies outside of the above-predetermined range, the other new magnetic field $H'_v$ whose magnitude is to satisfy an equation $|H_T| > |P_c|$ (in which case $H'_v = 0$ is possible) is applied so as to put the Josephson device 60 into the nonsuperconductive state.

When the leads 501 and 102 are formed into the shape of a multiple loop (FIG. 6) so as to intensify their magnetic coupling with the Josephson device 60, the currents $I_v$ and $I_B$ to flow through the leads 501 and 102 may have small values. In other words, it is possible to make the resistor 502 a resistor of greater resistance and the constant-current source 101 a current source of smaller capacity.

Although, in the above embodiment, the circuit 50 and the Josephson device 60 have been connected in common to the secondary coil 40, it is also possible to connect the Josephson device 60 to the secondary coil 40 and to provide a new secondary coil separate from the secondary coil 40 which is magnetically coupled with the primary coil 31, the circuit 50 being connected to the new secondary coil. Although, in the above embodiment, the Josephson device 60 has been supposed to have one Josephson junction, it may well be replaced with a device which has a plurality of serially-connected Josephson junctions magnetically coupled with the leads 501 and 102. According to this arrangement, it becomes more difficult for current to flow in the nonsuperconductive state, so that the rectification characteristics of voltages are enhanced. In addition, the Josephson device 60 may well be reduced by a superconductive coil which is in the superconductive state and exhibits a zero resistance while a magnetic field $H_T$ applied thereto does not exceed a predetermined value $P_c$, and which falls into the non-superconductive state and acts as a resistor of high resistance when the magnetic field $H_T$ has exceeded a predetermined value $P_c$. Further, although the constant-current source 101 has been placed at room temperature on the left side of the line 20, it may well be placed at the extremely low temperature on the right side of that line.

In the first embodiment, the circuit 10 has been disposed in order to produce the bias magnetic field $H_B$, but it may well be replaced with a permanent magnet 10 to generate the bias magnetic field $H_B$.

Figure 3:
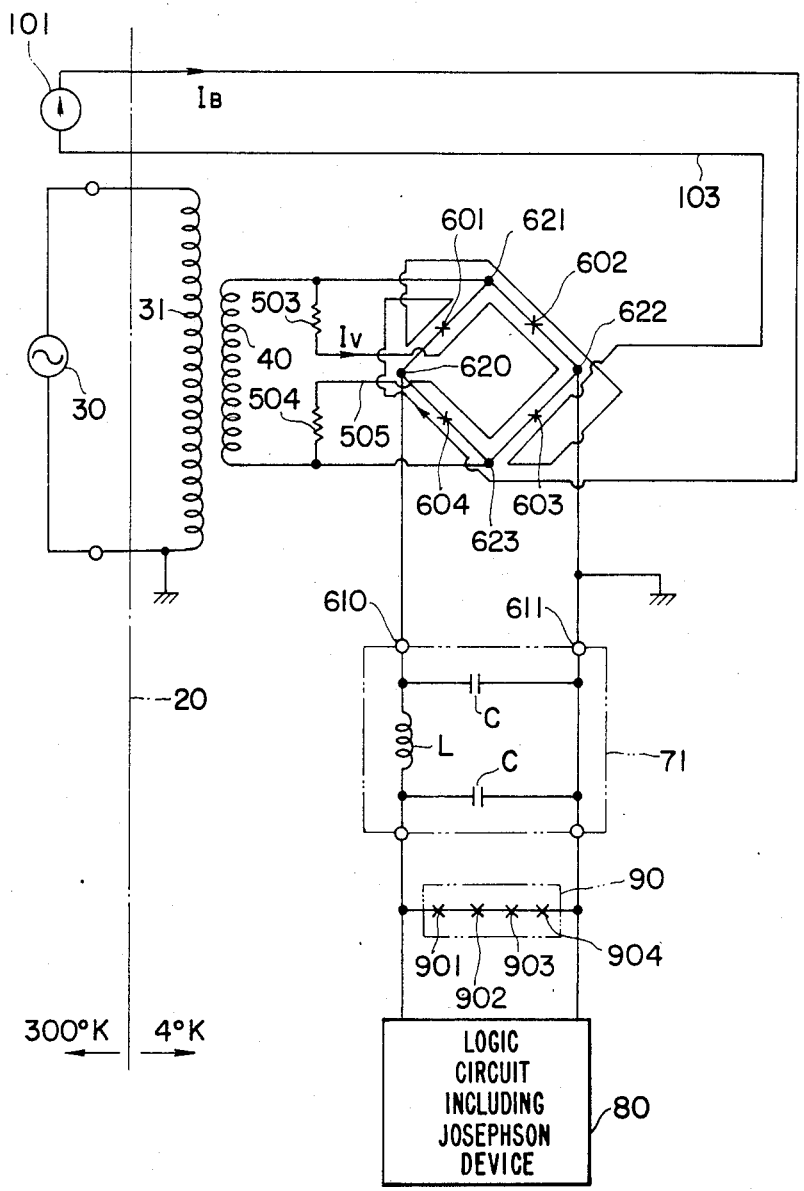
FIG. 3 is a diagram of a full-wave rectifying circuit according to this invention.

FIG. 3 is a diagram showing a full-wave rectifying circuit which is a second embodiment of this invention. A one-dot chain line 20 represents the same temperature boundary line as that described in FIG. 1. Leads and coils located on the right side of the line 20 are made of superconductive wire. From an A.C. power source 30 on the left side of the line 20, which is placed at room temperature of 300° K., an A.C. voltage $V_i$ is supplied to the primary coil 31 of a transformer on the right side of the line 20, which is at an extremely low temperature. Since the secondary coil 40, magnetically coupled with the primary coil 31, has a smaller number of turns than the coil 31, an A.C. voltage v is induced across the secondary coil 40 which is a stepped-down version of the A.C. voltage $V_i$.

A Josephson device 601 is connected to terminals 620 and 621, a Josephson device 602 is connected to the terminal 621 and a terminal 622, a Josephson device 603 is connected to the terminal 622 and a terminal 623, and a Josephson device 604 is connected to the terminals 623 and 620, to form a bridge circuit consisting of the Josephson devices 601–604. The property of the Josephson devices 601–604, that is, the property that they become superconductive when the externally applied magnetic field does not exceed the predetermined value $P_c$ and that they become nonsuperconductive when the magnetic field exceeds the predetermined value $P_c$, is the same as the property of the Josephson device of the half-wave rectifying circuit of FIG. 1. The stepped-down A.C. voltage v is applied across the terminals 621 and 623 from the secondary coil 40. A series circuit which consists of a resistor 503, the lead 505 and a resistor 504 is connected in parallel with the secondary coil 40. The lead 505 is a looped conductor which is proximate to the Josephson devices 601–604 in parts thereof and which is magnetically coupled with the devices 601–604. When a current $I_v$ having a sense and a magnitude which are respectively dependent upon the sign and the magnitude of the A.C. voltage v flows through the lead 505, a magnetic field $H_v$ of a polarity and a magnitude which are respectively dependent upon the sense and the magnitude of the current $I_v$ is generated in each of the Josephson devices 601–604.

On the other hand, a bias current is supplied from a current source 101 to the lead 103. The lead 103 is proximate to the Josephson devices 601–604 in parts thereof, and is magnetically coupled with the Josephson devices 601–604. The lead 103 is wired so that, when the current $I_v$ flowing through the lead 505 is in the direction of the arrow, this current $I_v$ and the current $I_B$ flowing through the lead 103 will have opposite senses in the parts proximate to the Josephson devices 601 and 603 and will have the same senses in the parts proximate to the Josephson devices 602 and 604. The magnitude of the bias current $I_B$ is set so that the bias magnetic field $H_B$ of a value greater than the predetermined value $P_c$ previously stated may be applied to each of the Josephson devices 601–604.

The terminals 620 and 622 are respectively connected to input terminals 610 and 611 of $\pi$ type filtering circuit 71, to which a load 80 is connected.

Figure 4A:
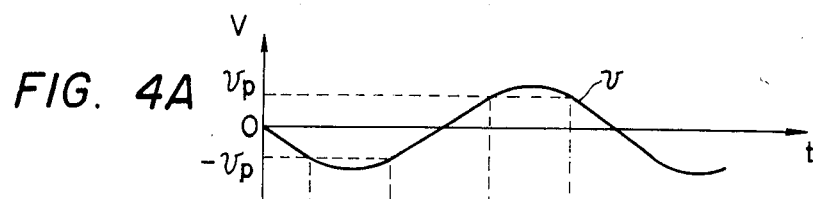
FIG. 4A is a diagram showing an input A.C. signal.
Figure 4B:
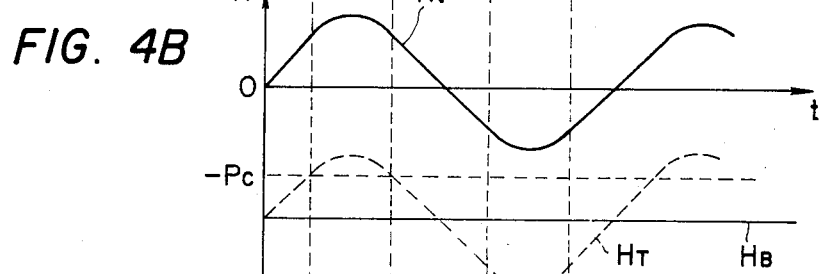
FIG. 4B is a diagram showing magnetic fields applied to Josephson devices (602, 604)
Figure 4C:
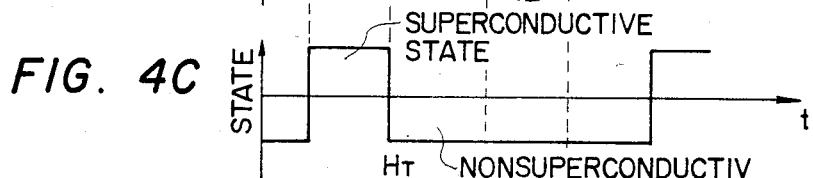
FIG. 4C is a diagram showing the conductive states of the Josephson devices (620, 604)
Figure 4D:
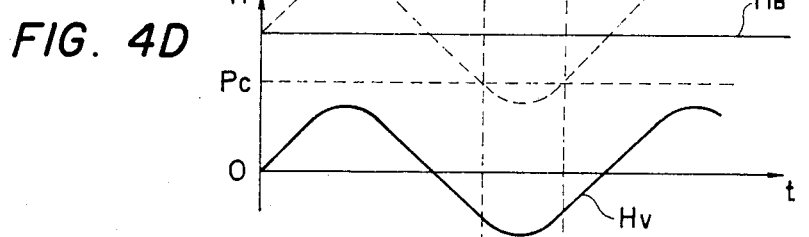
FIG. 4D is a diagram showing magnetic fields applied to Josephson devices (601, 603)

FIGS. 4A–4F are diagrams for explaining the operation of the second embodiment. FIG. 4A is a waveform diagram of the A.C. voltage v which is induced at the minus or negative end of the secondary coil 40 of the transformer. Since the sense and magnitude of the current $I_v$ are respectively dependent upon the sign and magnitude of the A.C. voltage v, magnetic fields generated in the Josephson devices 601 and 603 by the current $I_v$ and magnetic fields generated in the Josephson devices 602 and 604 by the current $I_v$ are equal, with their polarities and magnitudes depending upon the sign and magnitude of the A.C. voltage respectively, and they become $H_v$, as shown in FIG. 4B and FIG. 4D, respectively. A minus bias magnetic field shown at $H_B$ in FIG. 4B is applied to each of the Josephson devices 601 and 603 by the bias current $I_B$ which flows in the sense opposite to that of the current $I_v$ in the parts proximate to these devices 601 and 603. In contrast, a plus bias magnetic field $H_B$ as shown in FIG. 4D is applied to the Josephson devices 602 and 604 by the bias current $I_B$ which flows in the same sense as that of the current $I_v$ in the parts proximate to these devices 602 and 604.

Figure 4E:
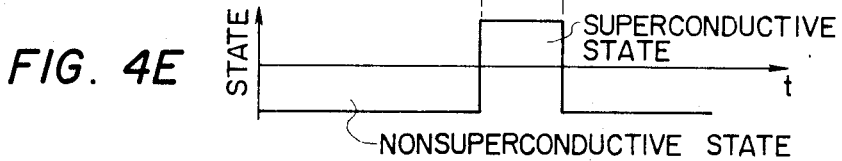
FIG. 4E is a diagram showing the conductive states of the Josephson devices (601, 603)

Accordingly, the combined magnetic field between the magnetic field $H_v$ and the magnetic field $H_B$ applied to each of the Josephson devices 601 and 603 becomes $H_T$ in FIG. 4B, while the combined magnetic field applied to each of the Josephson devices 601 and 603 is placed in the superconductive state when the magnitude of the combined magnetic field $H_T$ is smaller than the foregoing predetermined value $P_c$, in other words, when the minus combined magnetic field $H_T$ is closer to zero beyond the predetermined value $P_c$, i.e., when the A.C. voltage v is smaller than a value $-v_p$ as shown in FIG. 4A; whereas, it is placed in the nonsuperconductive state at all other times. It undergoes a state variation shown in FIG. 4C, depending upon the sign and magnitude of the A.C. voltage v. Likewise, each of the Josephson devices 602 and 604 undergoes a state variation as shown in FIG. 4E depending on the sign and magnitude of the A.C. voltage v.

More specifically, in the case where the A.C. voltage v has a negative sign and is greater than a certain magnitude, i.e., in the case where the A.C. voltage v is below the value $-v_p$, the Josephson devices 601 and 603 fall into the superconductive state and the devices 602 and 604 fall into the nonsuperconductive state, and the terminals 621 and 620 and the terminals 622 and 623 become equipotential, respectively. In the case where the A.C. voltage has a positive sign and is greater than a certain magnitude, i.e., in the case where the A.C. voltage v is above a value $v_p$, the states of the Josephson devices are just reversed, and the terminals 620 and 623 and the terminals 621 and 622 become equipotential, respectively.

Figure 4F:
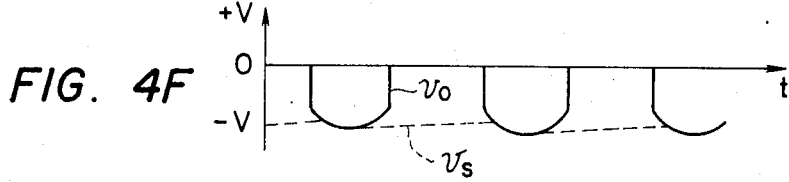
FIG. 4F is a diagram showing an output signal concerning the full-wave rectifying circuit in FIG. 3.

Accordingly, a voltage which is generated across the terminals 620 and 622 becomes as shown at $v_o$ in FIG. 4F under the condition where the filtering circuit 71 is not connected to the terminals 620 and 622. Consequently, an output with the voltage $v_o$ smoothed by the filtering circuit 71 becomes as shown at $v_s$ in FIG. 4F. Numeral 90 designates a well-known voltage regulator circiut which consists of four Josephson devices 901–904 connected in series. It is connected in order to regulate the output voltage of the filtering circuit 71 into a constant voltage.

In the above-described second embodiment, parts of the leads 505 and 103 may well be put into multiple loops so as to intensify the magnetic couplings of the leads 505 and 103 with the Josephson devices 601–604.

This full-wave rectifying circuit can be partly modified as in the case of the partial alterations described in conjunction with the foregoing half-wave rectifying circuit of FIG. 1. More specifically, although the circuit consisting of the resistor 503, the lead 505 and the resistor 504 has been connected to the secondary coil 40, a new secondary coil which is separate from the secondary coil 40 and which is magnetically coupled with the primary coil 31 may well be provided, the circuit including the lead 505 being connected to the new secondary coil. Further, the Josephson devices 601–604 are not restricted to a device having one Josephson junction, but anyone or all may well be a device having a plurality of serially-connected Josephson junctions which are magnetically coupled with the leads 505 and 103. When devices having the plurality of Josephson junctions are used, it becomes more difficult for current to flow in the nonsuperconductive state, so that the rectifying efficiency of the voltage is enhanced. In addition, superconductive coils may well be employed instead of the Josephson devices 601–604.

Although, in the second embodiment, the circuit consisting of the constant-current source 101 and the lead 103 has been provided to produce the bias magnetic field $H_B$, it may well be replaced with a permanent magnet to generate the bias magnetic field $H_B$.

As set forth above, according to this invention, rectification employing a superconductive device is carried out, so that thermal noise is effectively eliminated and a stable rectified output can be obtained.

While we have shown and described several embodiments in accordance with the present invention, it is understood that the invention is not limited to the details shown and described herein but is susceptible of numerous changes and modifications as known to one of ordinary skill in the art, and we therefore do not wish to be limited to the details shown and described but intend to cover all such changes and modifications as are obvious to those skilled in the art.

What is claimed is:

1. A superconductive logic system comprising:
a Josephson junction connected to a pair of terminals,
a logic circuit including at least one Josephson device which operates in response to the application thereto of a low level D.C. voltage at a low temperature;
means for applying an A.C. signal to one of said pair of terminals connected to said Josephson junction;
means for applying a bias magnetic field of predetermined magnitude to said Josephson junction;
means for applying an alternating magnetic field in synchronism with said A.C. signal to said Josephson junction so that the state of said Josephson junction changes over between a superconductive state and a non-superconductive state alternately and repeatedly in response to the phase of said A.C. signal; and
a filter circuit connected between the other terminal of said pair of terminals and said logic circuit for supplying said D.C. voltage thereto.

2. A superconductive logic system as defined in claim 1 wherein said logic circuit, said Josephson junction and said filter circuit are disposed in a crygenic atmosphere and said A.C. signal applying means includes an A.C. source disposed outside said cryogenic atmosphere and means for connecting said A.C. source to said Josephson junction.

3. A superconductive logic system as defined in claim 1, wherein said means for applying said bias magnetic field includes a constant current source and a conductor which is connected to said constant current source and extends into proximity with said Josephson junction.

4. A superconductive logic system as defined in claim 1, wherein said A.C. signal applying means includes a transformer having a primary and a secondary winding, said Josephson junction having said one terminal thereof connected to said secondary winding.

5. A superconductive logic system as defined in claim 1, wherein a plurality of Josephson junctions including said first-mentioned Josephson junction are connected in the form of a bridge between said pair of terminals.

6. A superconductive logic system as defined in claim 1, wherein a voltage regulator circuit in the form of a series of Josephson junctions is connected across the output of said filter circuit.

7. A superconductive logic system as defined in claim 1, further comprising first to third Josephson junctions, in addition to said first-mentioned Josephson junction, and first and second terminals, and wherein said A.C. signal applying means is connected between said one of said pair of terminals and said first terminal, said filter circuit is connected between said other of said pair of terminals and said second terminal, said first Josephson junction is connected between said one of said pair terminals and said second terminal, said second Josephson junction is connected between said first and second termials, said third Josephson junction is connected between said first terminal and said other of said pair of terminals, and wherein said first to third Josephson junctions are disposed to receive said bias magnetic field and said alternating magnetic field along with said first-mentioned Josephson junction.

* * * * *